United States Patent [19]

Lunke et al.

[11] Patent Number: 4,929,115

[45] Date of Patent: * May 29, 1990

[54] RESILIENT SHAFT COUPLING

[75] Inventors: Manfred Lunke; Ulrich Falz, both of Dortmund; Jürgen Walter, Haltern, all of Fed. Rep. of Germany

[73] Assignee: Hackforth GmbH & Co., KG, Herne

[*] Notice: The portion of the term of this patent subsequent to Nov. 24, 2004 has been disclaimed.

[21] Appl. No.: 173,287

[22] Filed: Mar. 25, 1988

[30] Foreign Application Priority Data

Mar. 28, 1987 [DE] Fed. Rep. of Germany ....... 3710390

[51] Int. Cl.$^5$ .............................................. F16D 3/56
[52] U.S. Cl. .................................. 403/228; 403/220; 464/93; 464/96
[58] Field of Search ................ 403/220, 228, 225; 464/92, 96, 94, 93, 87

[56] References Cited

U.S. PATENT DOCUMENTS

| | | | |
|---|---|---|---|
| 2,178,077 | 10/1939 | Loftis | 403/228 X |
| 2,846,857 | 8/1958 | Hagenlocher | 464/93 X |
| 3,731,499 | 5/1973 | Morlon | 464/93 |
| 4,380,442 | 4/1983 | Amsel | 464/96 X |
| 4,603,997 | 8/1986 | Hundt et al. | 403/228 |
| 4,708,514 | 11/1987 | Walter et al. | 403/220 X |

FOREIGN PATENT DOCUMENTS

| | | | |
|---|---|---|---|
| 2740827 | 3/1979 | Fed. Rep. of Germany | 464/92 |
| 2164726 | 3/1986 | United Kingdom | 403/220 |

*Primary Examiner*—Andrew V. Kundrat
*Assistant Examiner*—Peter M. Cuomo
*Attorney, Agent, or Firm*—Becker & Becker

[57] ABSTRACT

A resilient shaft coupling in which a rigid primary and a rigid secondary coupling member are connected together by at least one resilient annular assembly of a multi-part construction that is composed of a number of ring segments that are identical and run circumferentially in close succession. Each segment is composed of axially outer metallic segment plates and an inner rubber body that has a trapezoidal cross-sectional shape with a radially outwardly increasing width in an axial plane. In order to obtain higher thermal stressability of the shaft coupling, at least one window is provided in the rubber body of each segment. The ends of the window end in the vicinity of the radial end faces of the segment. Openings are also provided in the two segment plates of each segment and are congruent with the window in the rubber body.

2 Claims, 2 Drawing Sheets

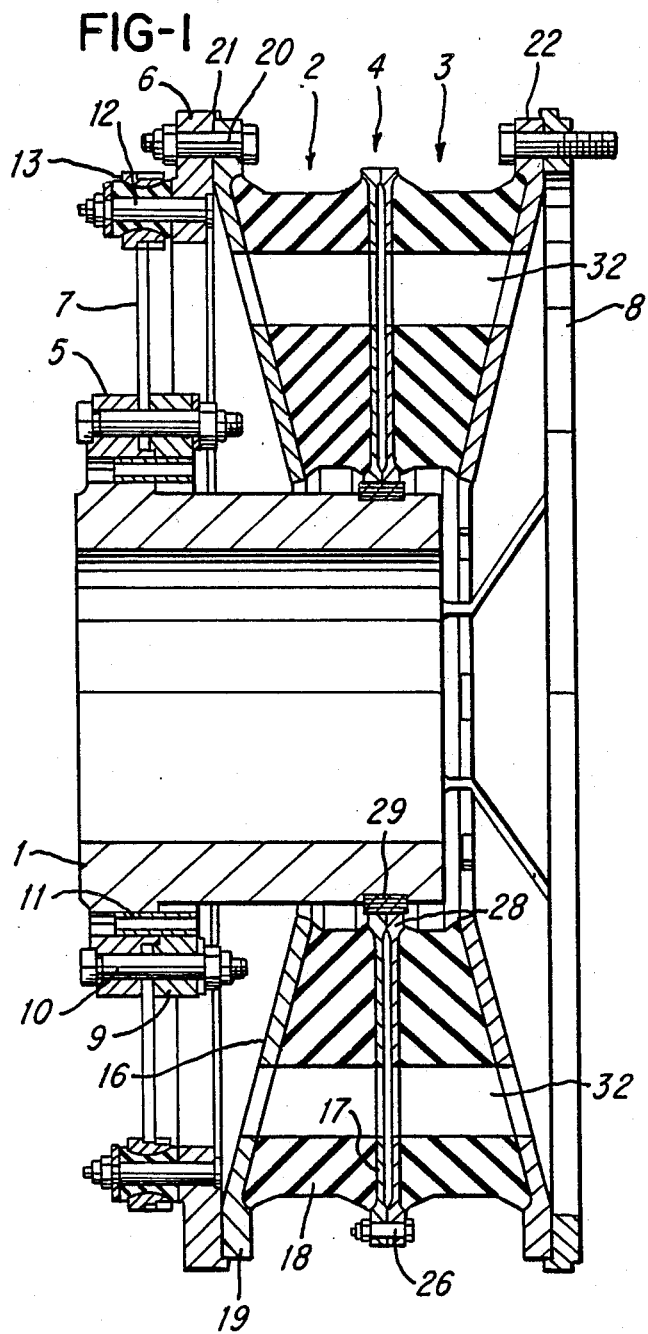

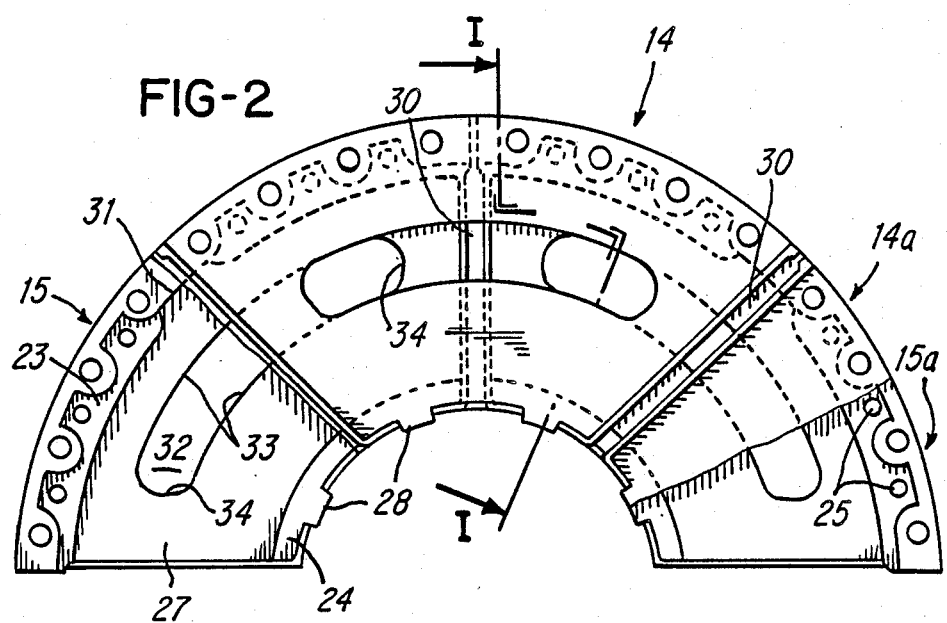
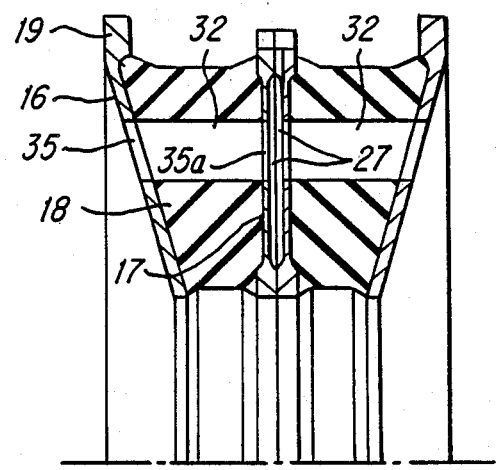

RESILIENT SHAFT COUPLING

BACKGROUND OF THE INVENTION

The present invention relates to an elastic or resilient shaft coupling, such as for a diesel engine drive mechanism.

Various flexible or resilient shaft couplings are known. One such coupling is disclosed in U.S. Pat. No. 4,708,514, Walter et al dated Nov. 24, 1987 and foreign British disclosure 2,164,726 Walter et al which correspond to each other and which belong to the assignee of the present invention.

An essential basis for the construction of a resilient shaft coupling of this type is the torque at rated load that has to be transmitted. A further important characteristic is the resilience that is required, in which connection a specific load capacity in the rubber material of the resilient annular assembly must be ensured. Taking into account the permissible shearing stress of rubber, the necessary shearing surface for a predetermined torque of a rated load can be ascertained. One of the main dimensions of such a resilient shaft coupling is also provided at the same time.

The demand for a desired resilience in the shaft coupling can be fulfilled with known properties of the rubber material that is used by calculating the necessary spring length of the rubber. A further characteristic regarding the main dimensions of the shaft coupling is thereby provided. With this type of procedure in regard to the determination of the rubber body, rotationally symmetrical rubber bodies are produced that have correspondingly larger dimensions for larger torques that are to be transmitted.

In the case of operational stresses on resilient shaft couplings of this type, the shaft coupling apart from the transmission of the mean driving torque, is also acted upon with a dynamic moment that can be attributed to the unavoidable torsional vibrations of the drive mechanism. As the dimensions of the rubber body increase, the ratio of thermal stressability to mechanical stressability becomes more and more disadvantageous. Regarding this, it should be noted that the specific mechanical load remains constant because of the dimensions calculated whereas in contrast, the temperatures in the core area of the rubber body rise sharply due to the poor heat conductivity of rubber when the rubber body is increasingly enlarged. With the measures for dissipating heat that have been customary up to now, a certain level of thermal stressability can be obtained; however, this level is not adequate in numerous applications. To this extent, the question of the obtainable thermal stressability comes more and more into the forefront when assessing the applicability of resilient shaft couplings.

It is therefore an object of the present invention to provide a resilient shaft coupling of the aforementioned general type that, at given mechanical properties, provides considerably greater thermal stressability, especially with rubber bodies having larger dimensions, to avoid unacceptably high heating in the core area of the rubber body.

BRIEF DESCRIPTION OF THE DRAWINGS

This object, and other objects and advantages of the present invention, will appear more clearly from the following specification in conjunction with the accompanying drawings, in which:

FIG. 1 is an axial cross-sectional view of one exemplary embodiment of the resilient shaft coupling of the present invention;

FIG. 2 is a side view of segments of a four-part resilient annular assembly of the inventive shaft coupling, as fitted into position; and FIG. 3 is a cross-sectional view of the resilient annular assembly taken along the line I—I in FIG. 2.

SUMMARY OF THE INVENTION

The present invention provides a resilient shaft coupling in which rigid coupling members on both the driving side and the driven side are interconnected by at least one resilient annular assembly, which has outer metallic annular disks, or plates, each of which is composed of several segments, to the inner surfaces of which is vulcanized an elastomeric body, of rubber or the like, which is composed of an equal number of segments and in an axial plane has a trapezoidal cross-sectional shape with a width that increases radially outwardly, wherein the annular assembly in its entirety being composed of two ring halves that are disposed in axially abutting relationship as mirror images, with the segments of the one ring half being staggered or offset by half of a segment division in relation to the segments of the other ring half, and with the central metallic annular disks or plates of the two ring halves being clamped to each other at their outer adjacently situated peripheral edges, whereby the rubber body of each segment is provided with at least one window, which extends in the circumferential direction along a circular line and also extends over the axial thickness of said rubber body, with the curved walls of said window extending approximately coaxially or concentrically and with the ends of the window terminating in the vicinity of the radial end faces of the associated metallic plate segments, and whereby each of the two segment plates of each segment contain an opening that is congruent or aligned with the contiguous window in the rubber body.

The radial position of the windows is advantageously selected such that during operation of the shaft coupling, approximately equal temperatures prevail in the core areas of the two portions of the rubber body that are adjacent to the window.

The advantage that can be achieved with the present invention is based upon the fact that in the core area of the rubber body, in which the heating is normally greater than the edge regions, the material is eliminated by defining a window. Although a certain reduction in the mechanical stressability of the shaft coupling can be expected, in return a much greater gain in thermal stressability is surprisingly obtained. In comparison to the overall size that has been customary up to now, while the mechanical stressability is not intended to decrease, the shaft coupling merely needs to be enlarged slightly in its outer dimensions. However, as already mentioned, a disproportionately greater gain in thermal stressability of the shaft coupling offsets this enlargement. By the use of this principle, the difficulties present in known shaft couplings, namely the occurrence of unacceptably high heating in the core area of the rubber body, can be alleviated by simple means.

The size of the windows can be determined by the following procedure. To begin with, the trapezoidal full cross-section of the rubber body, with given dimensions and known material characteristics at a certain heat stress, is examined mathematically with regard to heat distribution and the extent of allowable maximum temperatures. By this means, the position and the size of the window can be determined. The center of the high temperatures in the rubber body is not necessary here as far as heat technology is concerned. After this, in a second stage, the radial heights of the resulting portions of the rubber body, which are situated on both sides of the window, are determined in such a way that approximately equal temperatures prevail in the centers of the two portions when there is a certain heat action. In so doing it will be observed that the radial heights of the two portions are not identical, but that the radial height of the outer portion is less than that of the inner portion. The cause of this is essentially the trapezoidal cross-sectional shape of the rubber body, for which reason the outer portion has a greater axial extent than does the inner section.

The present invention also has a further substantial advantage. This can be attributed to the fact that the windows in the rubber bodies extend into the abutting metallic segment plates, so that the entire resilient annular assembly has extending through it axial passages through which cooling air can flow. A better ventilation of that side of the shaft coupling facing the drive motor, which is generally more highly thermally stressed than the opposite free side, can also be achieved at the same time. This will be examined in greater detail in the following part of the specification.

In addition, further specific features of the present invention will be described in detail subsequently.

DESCRIPTION OF PREFERRED EMBODIMENTS

Referring now to the drawings in detail, in the resilient shaft coupling embodiment illustrated in the drawings, the resilient annular interconnection or intermediate assembly is composed of two identical annular members or parts 2, 3 that butt against one another, in the manner of a mirror image, at their dividing plane. The primary rigid coupling member is constructed as a hub 1, which extends beyond the dividing plane of the ring or annular parts 2, 3 of the resilient annular or ring assembly 4 to the inside of the shaft coupling. Formed on the outer front face of the hub 1 is a fastening flange 5, which serves for the non-rotational connection of a drive ring 6. As a connecting link between the hub 1 and the drive ring 6, there is provided a diaphragm ring 7 of spring steel that allows for a certain axial movability between the primary coupling member, namely the hub 1, and the secondary coupling member, namely a flange ring 8.

The diaphragm ring 7 is non-rotatably braced against the hub 1 with the aid of a clamping ring 9; in order to create the axially directed clamping force, several clamping bolts 10 are provided. These bolts 10 are retained in through-holes in the flange 5 and in the clamping ring 9, and are equidistantly distributed over the entire periphery. Disposed on a circle that is smaller than the imaginary circle of the clamping bolts 10, further aligned through-holes are provided in the parts 5 and 9, with known clamping sleeves 11 being frictionally retained in these further holes. These sleeves, together with the clamping bolts 10, produce the non-rotational connection between the parts 5 and 9.

The drive ring 6 contains, on an inner circle, a number of through-holes in which connecting bolts 12 are positively retained. The outer ends of the connecting bolts 12 pass through a bearing element 13 of limited resilience that is provided on the outer periphery of the diaphragm ring 7. This construction makes possible a bending of the diaphragm ring 7 in axially opposite directions without the risk of imposing transverse stresses on the connecting bolts 12 or on the drive ring 6.

In the illustrated embodiment, the two halves 2, 3 of the resilient annular assembly 4 each comprise four sectors or segments, with two sectors or segments 15, and 15a of the rear half 2, a sector or segment 14, and part of a further sector or segment 14a being illustrated in the side view of FIG. 2. The resilient annular assembly 4, in cross-section, has an essentially trapezoidal shape, as can be seen from FIG. 1. Such a shape is known. It serves the purpose of economizing on rubber material and, at the same time, on weight due to the fact that the torsional stress is smaller in those areas of the rubber body that are closer to the axis of rotation than in those areas that are disposed radially outwardly thereof.

The resilient annular assembly 4 is composed of a total of eight identical segments 14 and 15. Each segment is composed of an axially outer sector or segment plate 16, an axially inner sector or segment plate 17, and a rubber body 18 that is vulcanized to the inner surfaces of the plates 16, 17. Integrally formed on the outside of the outer segment plates 16 are circumferential projecting rims 19 that extend along a circular sector. Those surfaces of the rims 19 that extend at right angles to the axis of rotation are disposed parallel to the abutment surfaces on the drive ring 6 on the one hand, and on the flange ring 8 on the other hand. In order to clamp the assembly 4 to the drive ring 6 and to the flange ring 8, fitted bolts or dowels 20 are inserted in aligned bores in the parts that are to be connected; the dowels 20 are equipped with a threaded end and a nut. Radially projecting annular shoulders 21 or 22 are formed on the driver ring 6 and on the flange ring 8 in order to center the segments (see FIG. 1).

The inner segment plates 17 are in contact with one another only at their radially inner and outer edges. Here, annular plane-parallel outer and inner abutment surfaces 23 and 24 are provided (FIG. 2). The reciprocal clamping is effected on only the outer abutment surfaces. Axially parallel holes or through-bores that are successively arranged in the circumferential direction are provided in the area of these abutment surfaces 23, with clamping bolts 26 being secured in these holes 25.

Defined in the wall of each segment plate 17, between the inner abutment surface 24 and the outer abutment surface 23, is a large recess or cavity 27 that extends from one radial end face edge to the opposite radial end face edge of the segment plate 17. In its center, the outer abutment surface 23 is interrupted by a notch or indentation 31, which extends the cavity 27 as far as the peripheral edge.

Formed on the inner peripheral edge of the segment plates 17 are radially projecting lands or ribs 28, the free outer surface on which lie on a common circle that is concentric with the hub 1. By means of these lands 28, the parts 2, 3 of the resilient annular assembly 4 are supported radially against the hub 1. In this connection, disposed between the hub 1 and the lands 28 is a bearing sleeve or bushing 29, that is inserted in a circumferential groove in the hub 1 and therefore cannot move axially.

The task of the bearing bushing 29 is to improve the sliding motion of the lands 28 with respect to relative movements between the two rigid coupling members 1 and 8, both in the axial direction and in the direction of rotation.

The segments 14 or 15 of the two halves 2 or 3 of the resilient annular assembly 4 are clamped together in a position in which they are staggered in relation to one another by half a segment division. In this way, a closed rigid ring is formed without any additional back-up or support rings. At the intersections of the segments 14 or 15, a radial end face gap 30 is left clear in each case, through which on the outside, air can penetrate into the passages which extend in the circumferential direction of the segments and are formed by the large cavities 27. During operation of the coupling, this air is driven outwardly, as a result of centrifugal force, through the outlet slots at the notches 31 in the center of the inner segment plates 17, so that a forced flow is produced that brings about good cooling of the inner segment plates 17, and hence of the rubber bodies 18 which are fastened to the latter.

In order to avoid excessive thermal stresses on the rubber bodies 18, a window 32 having the cross-sectional shape illustrated in FIG. 2 is left clear in the rubber body of each part 2, 3. Each individual window 32, which has end walls 34 and curved walls 33 that are essentially concentric to the axis of rotation, extends over the axial thickness of the rubber body 18. The window 32 is extended into the outer and inner segment plate 16 and 17 respectively, which contain congruent or aligned openings 35 and 35a (see FIG. 3).

As FIG. 1 shows, that portion of the rubber body 18 that is on the radially outer side of the window 32 has a smaller radial thickness than does the radially inwardly disposed portion of the rubber body. This is related to the fact that the radial position of the window 32 is selected in such a way that approximately equal temperatures prevail during operation of the shaft coupling in the core areas of the two portions of the rubber body 18 that are adjacent to the window.

Because the rubber bodies 18 of the individual parts contain windows 32, passages are produced that extend in the axial direction from one end face to the other end face of the resilient annular assembly 4; through these passages, cooling air can flow during operation of the shaft coupling. This brings about an additional cooling of the rubber bodies 18 in the areas that adjoin the window 32. As a result of this, better ventilation of the space between the resilient shaft coupling and the adjacent flywheel is also obtained.

This is especially important, particularly if the flywheel is cup-shaped and the shaft coupling closes the inner space completely or partially. As a result of this arrangement, relatively high temperatures prevail in the space between the shaft coupling and the base of the cup. This means that the flywheel side of an elastic shaft coupling is usually more highly thermally stressed than is the opposite exposed side. With such a structural design of the flywheel, the inner space can be effectively ventilated, due to the aforementioned, inventive axially extending passages in the area of the resilient annular assembly, and hence the thermal stress on the flywheel side of the shaft coupling can be reduced at the same time.

The present invention is, of course, in no way restricted to the specific disclosure of the specification and drawings, but also encompasses any modifications within the scope of the appended claims.

What we claim is:

1. A resilient shaft coupling for interconnecting a rigid coupling member on a driving side and a rigid coupling member on a driven side particularly for a diesel engine drive mechanism with which considerably greater thermal stressability especially with elastomeric bodies having larger dimensions must be provided to avoid unacceptably high heating therein, said coupling having an axial direction and having the improvement in combination therewith comprising:

at least one resilient annular assembly that provides said interconnection between said rigid coupling members and that includes two ring halves that are disposed in axially abutting relationship as mirror images of one another, with each of said ring halves being divided into segments that are successively arranged in a circumferential direction, with each of said segments having a location of radial end faces thereof and comprising, when viewed in the axial direction of said coupling, an outer segment plate, an inner segment plate, and therebetween an elastomeric body that is vulcanized to said inner and outer segment plates, with said elastomeric body having a trapezoidal cross-sectional shape and including an entire axial width thereof which increases in a radially outer direction; the segments of one of said ring halves are offset relative to the segments of the other of said ring halves by one half of a segment division, with said inner segment plates of abutting ring half segments being clamped together; said elastomeric body of each of said segments is provided with at least one window, with each such window extending in a circumferential direction, as well as over the entire axial width of said elastomeric body, and having two end walls and therebetween two essentially concentric curved walls, with said end walls of said window terminating in the location of radial end faces of said segment; each of said inner and outer segment plates of each of said segments is provided with at least one opening, which is congruent with said at least one window of said elastomeric body of that segment, said window and said opening collectively forming an axial passage through which cooling air flows to alleviate problems of greater thermal stressability.

2. A resilient shaft coupling in combination according to claim 1, in which each of said segments includes a single window in said elastomeric body that divides the latter, in a radial direction thereof, into two portions each having core areas wherein temperatures rise sharply due to poor heat conductivity of the elastomeric body when the latter is increasingly enlarged, with a radial position of said window in said elastomeric body being selected in such a way that during operation of said shaft coupling, approximately equal temperatures prevail in said core areas of said two portions of said elastomeric body to avoid unacceptably high heating in the core areas.

* * * * *